United States Patent [19]
MacDuff et al.

[11] Patent Number: 6,047,207
[45] Date of Patent: Apr. 4, 2000

[54] METHOD OF USING A MEASURING INSTRUMENT AND DATA GATHERING SYSTEM

[75] Inventors: Ian G MacDuff, Bothell; Daniel J Powers; Clinton S Cole, both of Issaquah, all of Wash.

[73] Assignee: Heartstream, Inc., Seattle, Wash.

[21] Appl. No.: 09/075,999

[22] Filed: May 11, 1998

Related U.S. Application Data

[63] Continuation-in-part of application No. 08/649,414, May 16, 1996, Pat. No. 5,749,913, and a continuation-in-part of application No. 08/314,395, Sep. 28, 1994, Pat. No. 5,549,115.

[51] Int. Cl.$^7$ ........................................................ A61B 5/04
[52] U.S. Cl. ................................................................ 600/510
[58] Field of Search .................................. 371/21.5, 25.1; 607/5, 27; 600/509, 510, 523, 524

[56] References Cited

U.S. PATENT DOCUMENTS

| | | | |
|---|---|---|---|
| 3,946,744 | 3/1976 | Auerbach | 607/27 |
| 4,006,737 | 2/1977 | Cherry | 600/523 |
| 4,250,888 | 2/1981 | Grosskopf | . |
| 4,457,315 | 7/1984 | Bennish | 600/524 |
| 4,506,677 | 3/1985 | Lambert | 600/518 |
| 4,715,385 | 12/1987 | Cudahy et al. | . |
| 5,002,062 | 3/1991 | Suzuki | . |
| 5,228,450 | 7/1993 | Sellers | . |
| 5,333,616 | 8/1994 | Mills et al. | . |
| 5,334,030 | 8/1994 | Brilliott | . |
| 5,338,210 | 8/1994 | Beckham et al. | . |
| 5,345,367 | 9/1994 | Pierce et al. | . |
| 5,593,426 | 1/1997 | Morgan et al. | . |
| 5,749,902 | 5/1998 | Olson et al. | . |

FOREIGN PATENT DOCUMENTS

| | | |
|---|---|---|
| 3221339A1 | 6/1982 | Germany . |
| 4337110C1 | 10/1993 | Germany . |
| 2225459 | 10/1988 | United Kingdom . |

*Primary Examiner*—William Kamm
*Attorney, Agent, or Firm*—Cecily Anne Snyder

[57] ABSTRACT

A method of using a measuring instrument of unknown calibration in such a way as to correct the calibration. The method includes taking a measurement with the instrument, storing the measurement in a data storage medium, and correcting the measurement at a later time based on a determination of the amount of error in the measuring instrument. The method may also be used to remove error that is present as a result of inaccuracies that are present in the data gathering instrument. This method can be used in a write variety of instruments that are used to take measurements, but is particularly useful for medical instruments.

11 Claims, 14 Drawing Sheets

METHOD OF USING A MEASURING INSTRUMENT AND DATA GATHERING SYSTEM

CROSS-REFERENCE TO RELATED APPLICATION

This application is a continuation-in-part of U.S. patent application Ser. No. 08/649,414, filed May 16, 1996, for "Electrotherapy Device and Detachable Memory Unit", now U.S. Pat. No. 5,749,913, and is a continuation-in-part of U.S. patent application Ser. No. 08/314,395, filed Sep. 28, 1994 for "Method and Apparatus for Gathering Event Data Using a Removable Data Storage Medium and Clock", now U.S. Pat. No. 5,549,115, the specifications of which are hereby incorporated by reference.

FIELD OF THE INVENTION

This invention provides a method of using an instrument of unknown calibration to take an accurate measurement. The measurement is corrected at a later time to remove error that may have been present in the measurement as a result of the inaccuracies of the measuring instrument. In a specific embodiment, this invention also relates to methods of gathering event data and removing error that may have been present as a result of inaccuracies in the event gathering instrument.

BACKGROUND OF THE INVENTION

Event data means information that can be related to particular intervals of time. The time intervals may be "elapsed time," i.e., time related to a reference event, such as power-up of the data collecting device or start of the data collection process. The time intervals may instead be synchronized with a master standard, such as Greenwich mean time or an arbitrarily selected timekeeper, in which case the time is known as "synchronized time." Accepted time units (seconds, minutes, etc.) are used to measure both elapsed time and synchronized time.

One example of event data is vehicular traffic flow information sampled on a given street, which may be plotted with respect to synchronized time (e.g., time of day in hours and minutes) over the course of a day or week. Another example of event data is an electrocardiogram showing a patient's heart electrical activity, which may be plotted versus elapsed time from a starting or triggering event. Event data also includes the raw data upon which the plots or graphs are based, whether in digital, analog or any other form. The event data may be a continuous data stream, a discontinuous series of events, or a combination of continuous data and discrete events.

Data logging is one way of gathering event data. In data logging, a data gathering instrument monitors a process or situation and gathers and stores information about the process or situation for later analysis or archiving. During subsequent analysis, it may be important to determine the relationship of the recorded events and the time of the events' occurrence. For this reason, data loggers usually have a way of annotating the collected data with the time of collection.

For example, in an industrial chemical process, reaction temperatures may be recorded by a data logger continuously for quality assurance purposes to determine whether the temperatures stayed within predetermined bounds during the reaction. If the chemical reaction temperature did exceed expected limits, a time reference permits later analysis to determine when it did so, and for how long, to help identify the necessary remedial action. To illustrate: The data logger could note either (1) that the chemical process exceeded its temperature parameters 17.3 minutes from time the reaction data logging began (i.e., the data logger is measuring elapsed time) or (2) that the reaction began at 4:30:00 PM and the excursion occurred at 4:47:20 PM (i.e., the data logger is measuring synchronized time). In both scenarios, the temperature excursion of the monitored chemical process can be related to other events going on in the chemical plant.

As another example, it may be desirable to record highway traffic for road utilization analysis. Unattended data recorders may be used to note the passage of vehicles as time series of events that can later be analyzed when the recording is recovered from the monitoring site. A time stamp for each event allows later reconstruction and analysis of traffic flow. Elapsed time data can be used to determine the frequency of vehicle traffic. Synchronized time data can be used to correlate the traffic with other events, such as shift changes at nearby businesses.

Data logging can also occur during medical treatment and procedures. For example, emergency medical technicians delivering emergency care may use defibrillators to deliver electrical shocks to a patient's heart. Event data regarding the patient's physiological condition may be logged to provide information to later caregivers about the patient and about the care the patient received, such as the time required for the emergency medical technicians to reach the patient and the patient's response to the treatment.

As discussed above, data collected from data loggers may be analyzed to extract useful time-based information. Part of the event data analysis often requires reference to a local clock by the data user to place the time stamped on the collected event in the context of the data user's time. For example, if a portion of the collected event indicates that the event occurred at 4:00 PM, the data user must assume that the data logger clock and the data user's local clock indicated "4:00 PM" at the same time. In other words, the data user must assume that the data logger clock and the data user's local clock are synchronized. In addition, the data user must assume that the data logger'measure of a second or a minute is the same as the data user's local measure of a second or a minute so that the recorded time (whether elapsed time or synchronized time) may be interpreted in a meaningful way.

The synchronized time indicated by a data logger's clock may drift from the synchronized time indicated by the master timekeeper because of environmental conditions, mechanical problems, or other reasons. Also, the act of setting the data logger clock could introduce discrepancies between the time indicated by the data logger clock and the time indicated by the data user's clock, especially if the data logger clock is set by hand, or if the data logger's clock was not initially synchronized to the data user's clock prior to event data collection. These problems are compounded if a single data user receives event data from multiple data loggers, since each data logger clock may have been affected in different ways by environmental conditions, errors in initial setting, and the like.

For any measuring instrument or device, such as clocks, voltmeters, current meters, power meters, etc., calibration is typically performed on a periodic schedule in order to maintain the accuracy of the instrument. Calibration is the process of determining the absolute values corresponding to the gradations on an arbitrary or inaccurate scale or instrument when compared to a reference standard. Deviations from the reference standard that exist may result in changes being made to the instrument to bring the gradations to within an acceptable margin of error, or within the specifications set forth by the manufacturer.

In practice, it is common to refer to these steps (i.e., calibration and correction) together as "calibration". For example, instruments may be returned to the manufacturer for "calibration" according to a schedule. When the instrument is returned from the manufacturer, it is assumed that any deviations of gradations that fell outside of accepted error tolerances were corrected prior to returning the instrument.

In one example of this process, a series of measurements is taken by an instrument of unknown calibration. The same measurements are taken by an instrument of known calibration, typically a highly accurate reference instrument. The measurements are then compared to determine the amount of difference between the two measurements. Once the difference between the measurements is known, adjustments may be made to the device of unknown calibration to correct the gradations to correspond to the gradations of the reference device. As a result, each instrument provides the same measurement under identical conditions within an acceptable margin of error. In time, however, the calibrated instrument may accumulate additional error at which point it would be appropriate to again calibrate the instrument and make any necessary corrections to the gradations.

The frequency with which calibration and correction is performed varies from instrument to instrument. As will be appreciated by those skilled in the art, the need for calibration and correction does not necessarily correlate with the frequency with which the instrument is used. For example, an infrequently used instrument may require daily or weekly calibration and correction because of the amount of error that naturally accumulates in the instrument over time.

What is needed is a method of correcting measurements taken by a measuring instrument without necessarily calibrating and correcting the instrument's measuring gradations prior to use, wherein there is a high degree of confidence in the accuracy of the correction.

SUMMARY OF THE INVENTION

The invention provides a method of using a measuring instrument. A measurement is made with the instrument. The measurement may be stored in a data storage medium. The measurement is corrected at a later time to remove error that may have been present in the measurement as a result of inaccuracies in the measuring instrument.

Another aspect of the invention provides a method of measuring a parameter. The method comprises providing a measuring instrument. A measurement reading is taken with the instrument. After the measurement is made, the amount of error in measurements made by the instrument is determined based on a mathematical model. The reading is adjusted as a result of the determination of the amount of error. In one aspect of the invention, the determination of the amount of error comprises making a plurality of additional measurements with both the measuring instrument and with a reference instrument in order to prepare a mathematical model. The mathematical model of error accumulation may be determined either prior to using the instrument or after using the instrument.

Another aspect of the invention provides a method of gathering event data using a data gathering instrument having a clock. The method comprises gathering patient ECG data using the data gathering instrument. The ECG data is stored and time information is stored using the instrument clock such that the data is associated with the time information to provide an indication of when the data was measured. The amount of error in the clock is determined after the measurement is taken by comparing time measurements of the clock with a more accurate clock.

Another aspect of the invention provides a data gathering system comprising a main data recovery unit including a main clock. The data gathering system further includes a gathering instrument. The data gathering instrument includes a processor and a sensor. The data gathering instrument also includes an instrument clock configured to communicate time information with the data gathering instrument and with the main data recovery unit. The data gathering instrument also includes an instrument data storage medium configured to transfer data to the main data recovery unit. The data gathering system also includes circuitry configured to compare the main clock with the instrument clock.

Another aspect of the invention provides a data gathering system comprising a housing. A clock is disposed in the housing and configured to provide time information. A measuring device is disposed in the housing. A data storage medium is also disposed in the housing and configured to store time stamp information generated by the clock and to store measurements made by the measuring device whereby the time, according to the clock, when measurements were made by the measuring device can later be determined. The data gathering system further includes circuitry configured to determine, after the measuring device makes measurements, amount of error produced by the clock.

Because error determination occurs after the measurement is taken, the expense of maintaining a periodic calibration schedule for a measuring device is reduced or eliminated. This can produce a significant time savings for infrequently used measuring instruments. Further, a less accurate, and therefore less expensive, measuring instrument may be used.

The invention is described in more detail below with reference to the drawings.

DETAILED DESCRIPTION OF THE INVENTION

Figure 1:
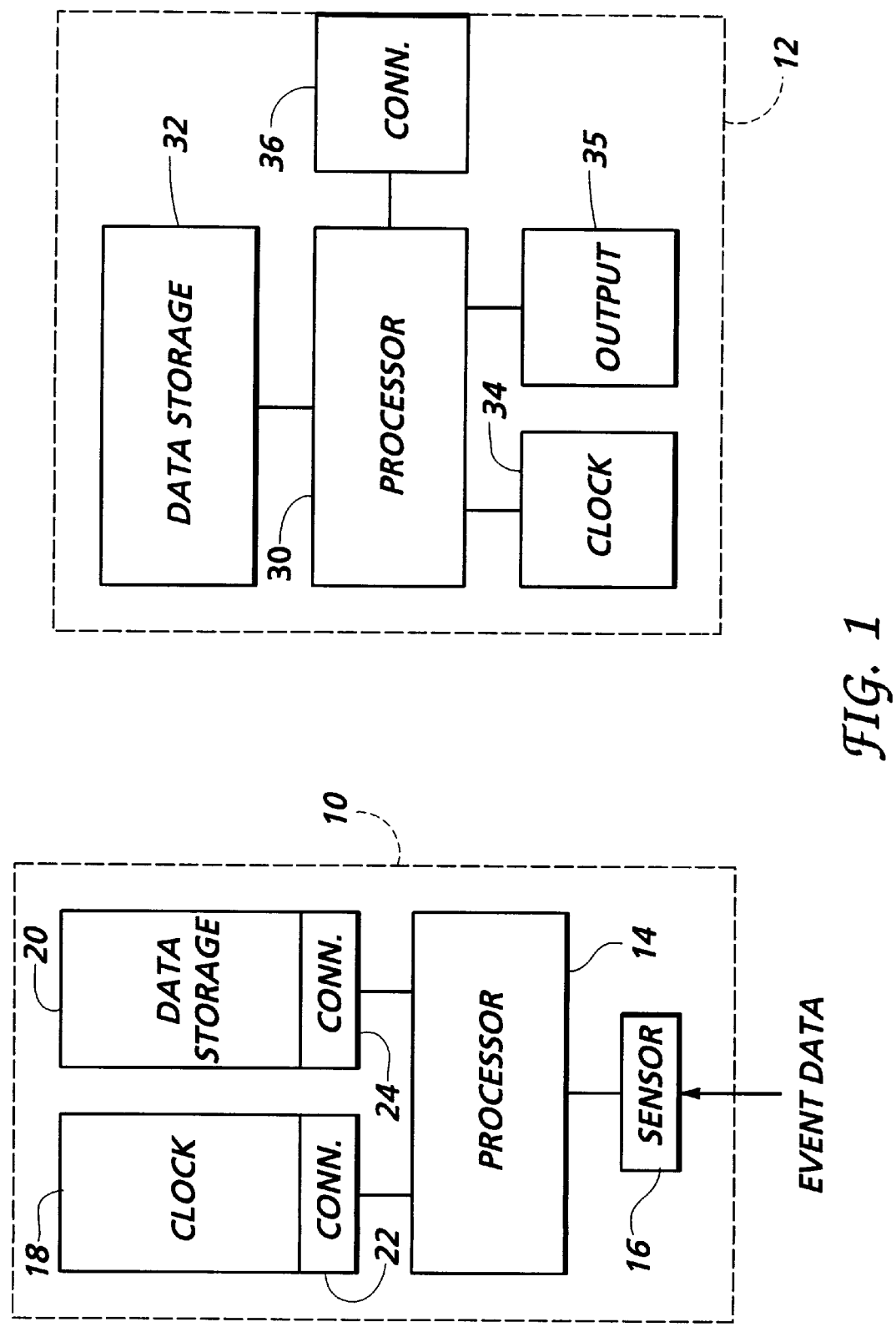
FIG. 1 is a schematic block diagram showing a data gathering system according to this invention.

FIG. 1 shows a data gathering system according to a preferred embodiment of this invention. The system has two main components: a data gathering instrument 10 and a main data recovery unit 12. The data gathering instrument 10 has a processor or controller 14 which interacts with at least one sensor or data gathering element 16, a removable clock 18 and a removable data storage medium 20. Clock 18 has a connector 22 for communicating clock information to and from the clock, and together the clock 18 and its connector 22 form a removable clock module. Likewise, the data storage medium 20 has a connector 24 for communicating data information to and from the data storage medium, and together the data storage medium 20 and its connector 24 form a removable data storage module. Data gathering instrument 10 can be a measuring instrument or device, for example: clocks; voltmeters; current meters; power meters; medical devices capable of measuring a biological parameter, such as blood pressure, electrocardiogram (ECG), blood oxygen level, temperature; or any other electronic device that gathers information or takes a measurement. Medical devices could include, for example, defibrillators, pulse oximeters, etc.

The purpose of the main data recovery unit is to receive data from one or more data gathering instruments for data storage, display and/or analysis. Main data recovery unit 12 includes a processor 30 communicating with an optional main data storage medium 32, a main clock 34, an output 35 such as a display, and a recovery unit connector 36. Connector 36 is designed to mate with clock module connector 22 so that clock information can be communicated between the clock module and the processor, as shown schematically in FIG. 3. Connector 36 is also designed to mate with data storage module connector 24 so that data can be communicated between the data storage module and the main data recovery unit, as shown schematically in FIG. 3.

Figure 2:
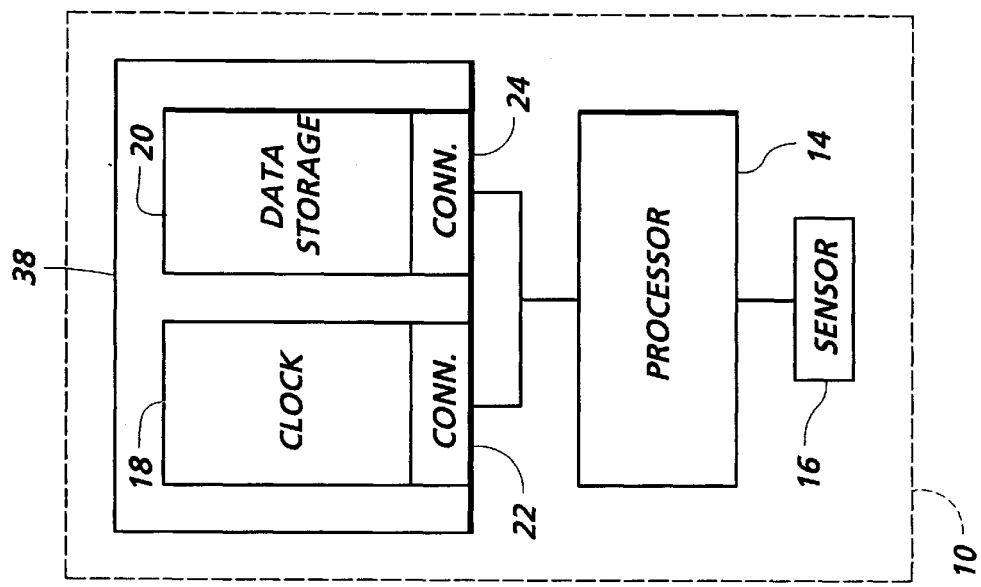
FIG. 2 is a schematic block diagram of a data gathering instrument according to one embodiment of this invention.

FIG. 2 shows an alternative embodiment of the data gathering instrument in which the data storage module and the clock module are physically connected, such as by being disposed in a common housing 38. Other ways of connecting the two modules are possible, of course, without departing from the scope of the invention. In this embodiment, connectors 22 and 24 may be part of a single connector, as shown schematically in FIG. 2. In any event, as in the FIG. 1 embodiment the connectors mate with connector 36 of the main data recovery unit to communicate data and clock information, as shown schematically in FIG. 3. The main data recovery unit can also operate as a reference instrument for purposes of ensuring the accuracy of the measurement taken by the data gathering instrument 10.

In use, the data gathering instrument 10 gathers event data using its sensor 16. The characteristics of the event data (e.g., discrete data versus continuous data) and the manner in which the event data is gathered by the instrument are dependent on the type of data gathering instrument being used and form no part of this invention. The event data is stored in data storage medium 20. Likewise, clock 18 generates time data associated with the event data. The time data requirements (e.g., elapsed time versus synchronized time) are dependent on the type of event data being gathered and the type of data gathering instrument being used and form no part of this invention. The time data is also stored in data storage medium 20.

In one embodiment, after gathering event data and generating time data, the instrument clock 18 and data storage medium 20 are separated from the data gathering instrument 10 and associated with the main data recovery unit 12, such as through connectors 22, 24 and 36 on the instrument clock 18, instrument data storage medium 20 and main data recovery unit 12, respectively. The event data and time data are transferred or copied from the instrument data storage medium 20 to the main data recovery unit for storage in main data storage medium 32, for display on output 35 and/or analysis in processor 30.

Connection of the instrument clock 18 with the main data recovery unit 12 through their respective connectors permits the main data recovery unit to compare the time indicated by the instrument clock 18 with the time indicated by the main clock 34. If this step is performed without any prior synchronization, the comparison will indicate the reliability of any synchronized time data associated with the event data stored in the instrument data storage medium. If, however, the instrument clock had been earlier synchronized with the main clock, the later comparison of the times indicated by the two clocks would permit the main data recovery unit processor to correct any discrepancies (e.g., time drift) in the stored time data, for example through a simple interpolation routine. Discrepancies between the data recovery unit clock and the data gathering instrument clock can be corrected without prior synchronization, of course, if the data gathering clock drift rate is known or can be measured or otherwise determined.

More generally, the invention provides a method of using an instrument, or device, of unknown calibration wherein a measurement is made with the instrument, and the measurement is corrected to remove error at a later time. In one embodiment, a measurement is taken and recorded using a measuring instrument of unknown calibration. After the measurement is taken, an approximation of the actual error of the measuring instrument is determined. This approximated error is then subtracted from the initial measurement to obtain a more accurate measurement.

Figure 6:
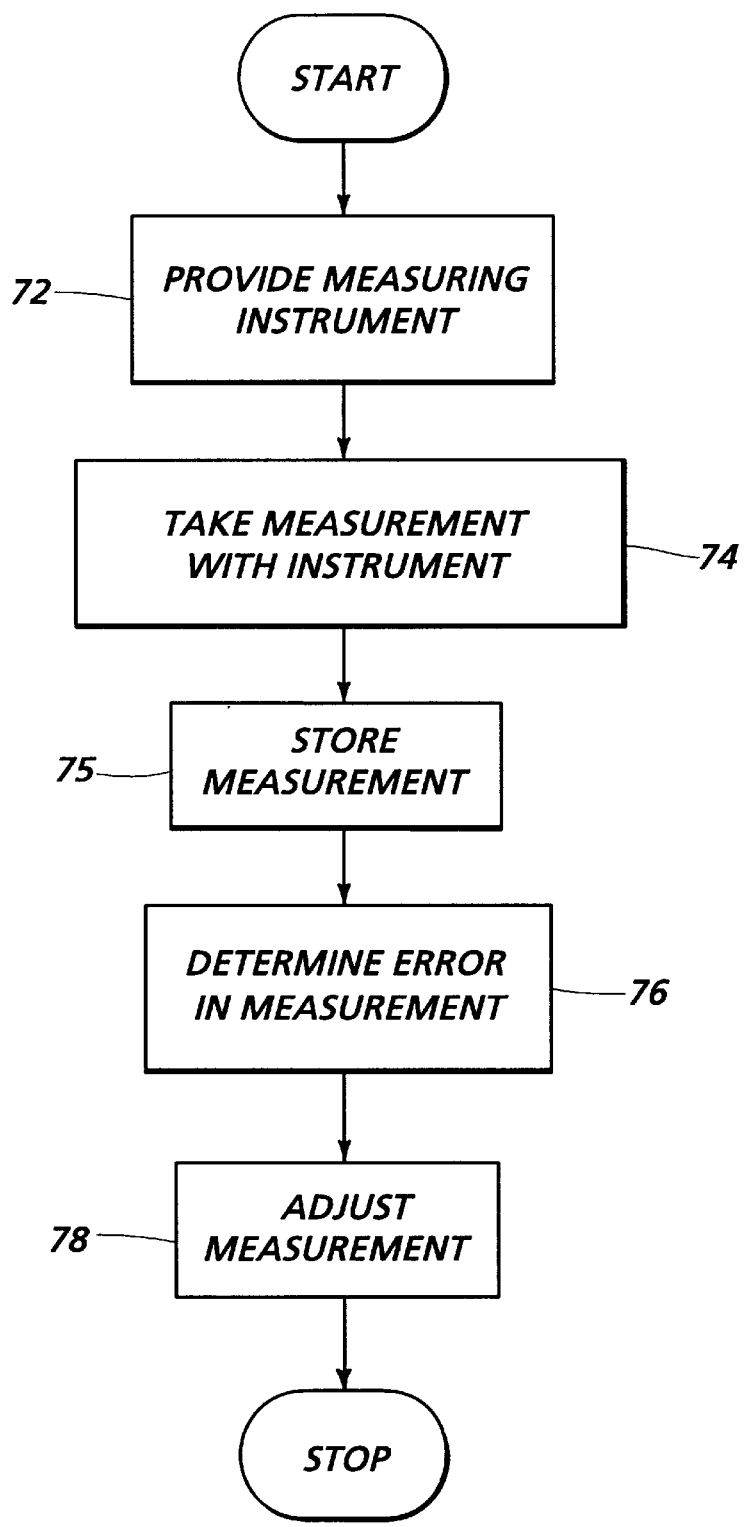
FIG. 6 is a flowchart illustrating a method of using a measuring instrument in accordance with one embodiment of the invention.

A flow-chart showing a method of the invention is provided in FIG. 6. A measuring instrument is provided 72. As described above, the measuring instrument could be, but is not limited to, for example, a clock, a voltmeter, a power meter, a flowmeter, a medical device, a data gatherer, oscilloscope, scale etc.

The measuring instrument takes a measurement 74. In one embodiment, taking a measurement comprises measuring time; however, in alternative embodiments, taking a measurement comprises measuring any other parameter capable of being measured by the instrument. Such parameters include, but are not limited to, speed, mass, force, voltage, current, power, distance, flow, volume, resistance, capacitance, torque, biological functions, etc.

Once the measurement has been taken, the measurement is stored 75. Storage includes any methods of mechanical or electrical storage. An example of electrical storage includes storing the information in a data storage device. The data storage device can be, but is not limited to, for example, a random access memory (RAM), read only memory (ROM), flash memory, static RAM, EPROM, or other appropriate memory storage device available.

The error in the measurement taken at step 74 is then estimated 76. The estimated error could be a single number or a range of numbers. The estimated error is then subtracted from the actual measurement to provide an adjusted measurement 78. The amount of error removed relative to the actual error will depend upon the techniques used to estimate the error, as described in more detail below.

In one method of predicting the error in the measurement, a measurement at a later time using both the measuring instrument and a reference instrument is taken. Any deviation in those measurements is then subtracted from the original measurement taken at step 74 to provide an adjusted measurement. It will be appreciated by those skilled in the art that in order to achieve the most accurate results following this method, the error should be predicted soon after the measurement is made. It will be appreciated, however, that, as used herein, "soon" is a relative term that may vary greatly depending upon how much error accumulation or drift is expected from the instrument and how much error can be tolerated in the measurement.

In some situations, it may be desirable to collect the data with the measuring instrument and immediately transmit the data to, for example, a reference instrument. Depending upon the difference in time between taking the measurement and transmitting the measurement to the reference instrument, a nearly real-time correction could be accomplished without actually calibrating the measuring instrument. In other applications, the time between collection of the data by the measuring instrument and error correction may be hours, days or weeks, etc. Where the error accumulation is very slow, or the tolerance of error is high, reasonably accurate results may still be obtained even though the correction is based on a measurement of error occurring days after the original measurement.

In a specific example, if the measuring instrument were a voltmeter measuring 8.0 volts across a circuit, and a determination was later made that the voltmeter was reading 0.2 volts too low, then it could be assumed that the original measurement was in fact 8.2 volts. Thus, the original recorded measurement should be corrected to 8.2 volts. It will be appreciated by those skilled in the art that the original recorded measurement may have been recorded mechanically, for example in a lab notebook, or electronically.

An advantage of correcting a measured value after taking the measurement is most apparent when applied to measuring instruments where the ratio of use to error accumulation is low. For example, this method would be useful for an instrument that is used once a month, but requires daily calibration because of the error accumulation. By correcting the measurements after the instrument is used, the need to maintain a periodic calibration schedule (as described above) is eliminated. This is particularly true where it is not critical to have the corrected measurement available at the time of measurement. However, in an alternative embodiment, the measurement may be corrected on a nearly real-time basis.

In an alternative embodiment, a pattern of error accumulation can be determined for the instrument or a class of instruments of the same design and manufacturing specifications. This pattern can be determined either before or after placing the instrument into service. The pattern of error accumulation can provide a mathematical model for how systematic error accumulates for an instrument over time. From the model a reasonable estimate of the actual error reflected in the measurement can be made.

More particularly, the error model can be an interpolation using a function that describes error accumulation over time. Specifically, the error model can be a linear interpolation that assumes error accumulates at a constant rate, or a non-linear interpolation that approximates error accumulation over time with a more complicated mathematical model.

FIGS. 7–13 describe an example of mathematical models for determining error and methods of estimating error based on an error model. The methods have been described using one set of data with error models calculated from that data. However, it will be apparent to those skilled in the art that these techniques may be applied in many situations.

Electronic clocks can be made using a crystal that oscillates at a usually steady frequency. Oscillations are counted to determine how much time has passed. Such crystals sometimes oscillate at a frequency that is slightly different from the specified or expected frequency. This error can, for instance, be due to the crystal being cut imprecisely. This error can be specified in parts-per-million (ppm) where one part per million equals $1 \times 10^{-6}$ or 0.000001. Consider, for example, a crystal having a specified frequency of 32768.000 Hz (oscillations per second) and having +2 ppm error. The error is therefore $(2 \times 32768.000)/10^6 = 0.066$ Hz. Thus, the crystal will actually vibrate at a frequency of 32768.066 Hz. The error leads to a linear accumulation of error (not shown) in a clock that uses this crystal. Every 32768 oscillations will be counted as one second, when, in fact, slightly less than one second has elapsed. The more time goes by, the greater the error, in a linear fashion.

There are other instances where accumulation of error may not be sufficiently predicted by a linear function, as in the example above, but instead by some other function which may be known. For example, frequency error in a crystal may vary with temperature. The crystal may oscillate accurately at room temperature but its frequency may change at high or low temperatures. For one brand of low-frequency crystals, this error can be modeled as an inverted parabola (see, for example, FIG. 7).

Figure 7:
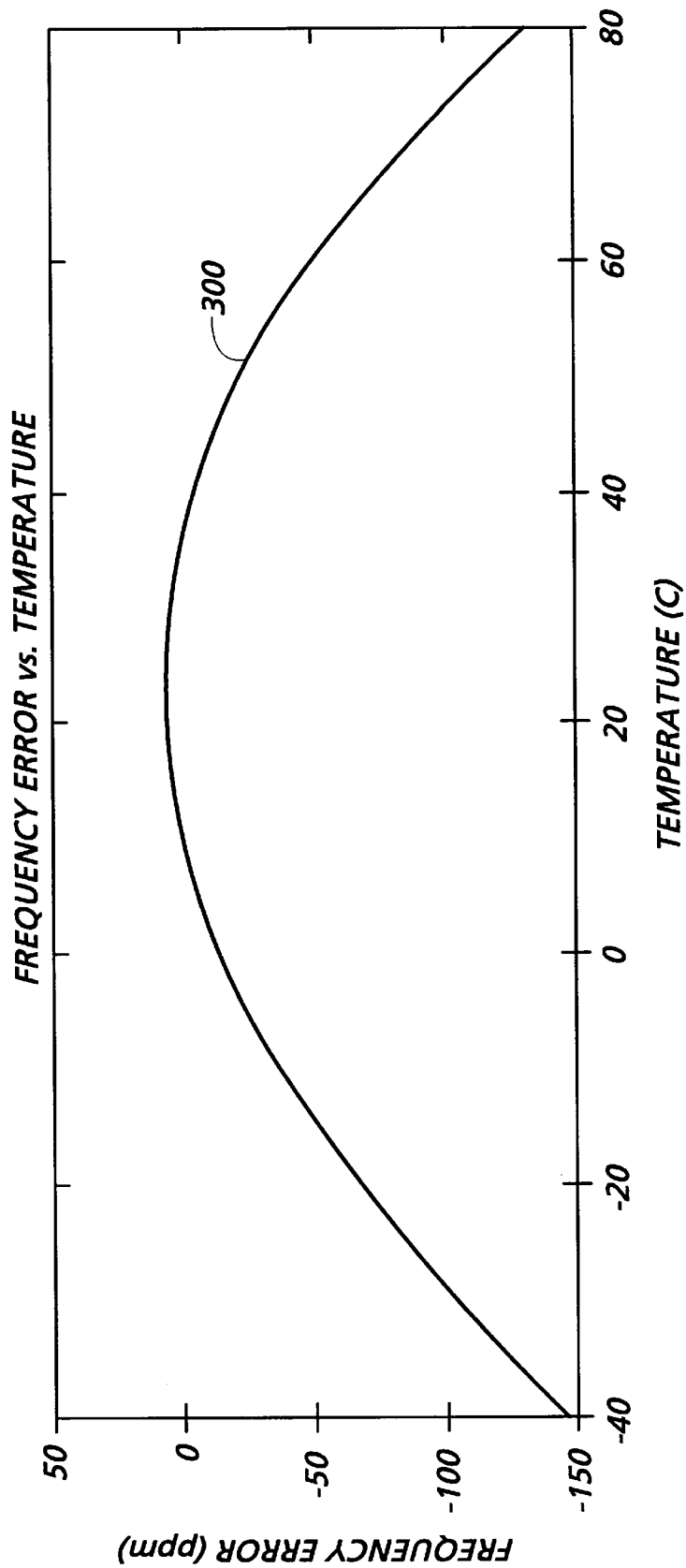
FIG. 7 is a plot illustrating an error function for a measuring instrument.

In a specific example, consider a crystal having error modeled by parabola with a peak of 2 ppm, a parabolic coefficient of 0.038 ppm/C$^2$ and a center temperature ($T_c$) of 22° C. This error parabola 300 is shown in FIG. 7. The horizontal axis represents temperature in degrees Celsius and the vertical axis represents error is parts per million. Error at any particular temperature is given by the parabolic function $P - X \cdot (T-T_c)^2$ where P is the peak of the parabola, X is the parabolic coefficient, T is temperature, and $T_c$ is center temperature. Thus, for a temperature of 10° C., the error may be calculated as:

$$\text{error} = 2 - [0.038 \cdot (10-22)^2] = -3.5 \text{ ppm}$$

Temperature, of course, is not always constant. For example, outdoor temperature typically increases during the day and decreases during the night. An example of a daily temperature profile can be modeled with a sine wave such as the sine wave 302 shown in FIG. 8. The temperature at any particular time point on the sine wave is given by the sine wave function $25 - \{10 \cdot \cos[2B(\text{time}-4)/24]\}$, where time is the particular time point in hours.

For a time of 17 hours, temperature is:

$$Temp_{t=17h} = 25 - \{10 \cdot \cos[2B(17-4)/24]\}$$
$$= 25 - \{10 \cdot \cos[3.4]\}$$
$$= 25 + 9.7$$
$$= 34.7° C.$$

Figure 8:
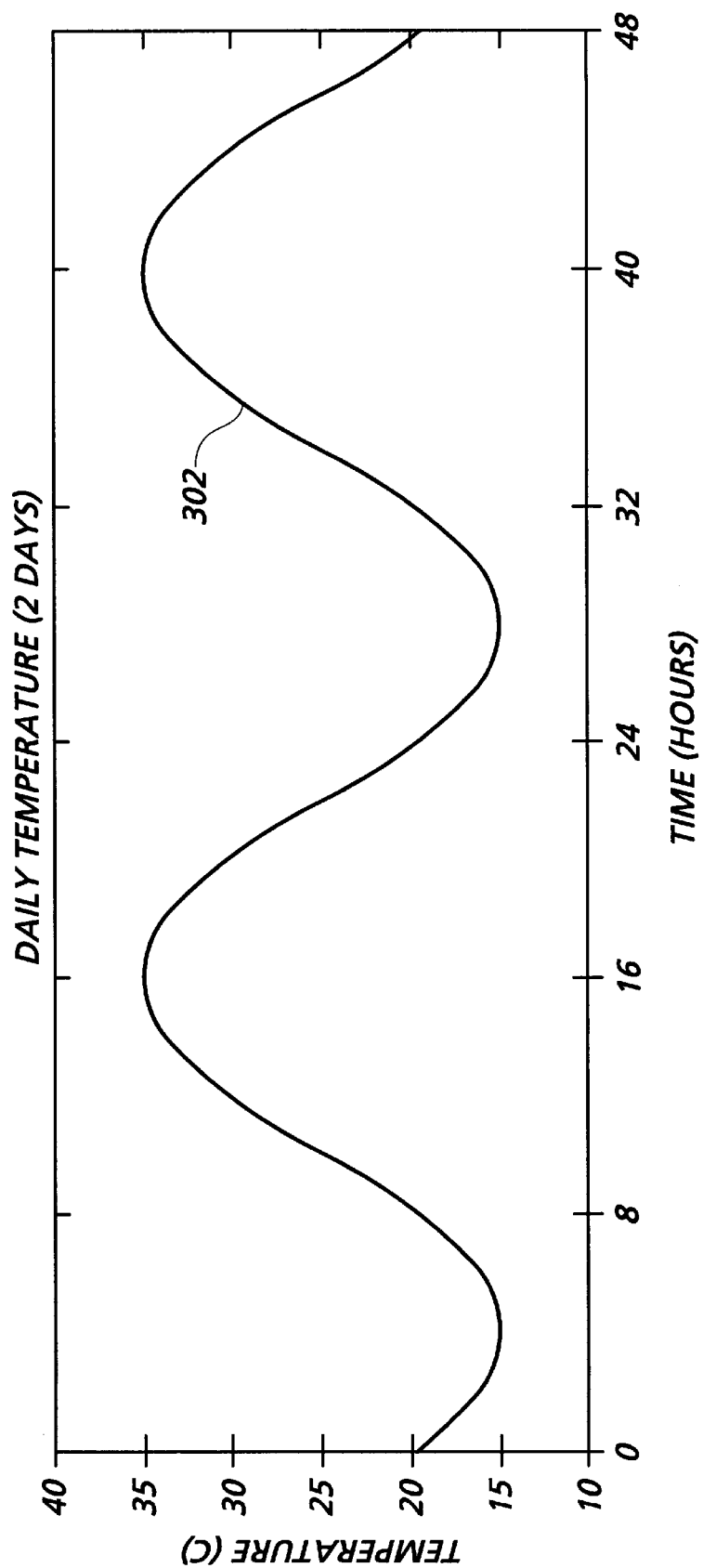
FIG. 8 is a plot illustrating changes in a parameter which affects error.

FIG. 8 illustrates temperature fluctuation 302 over a two day period.

Figure 9:
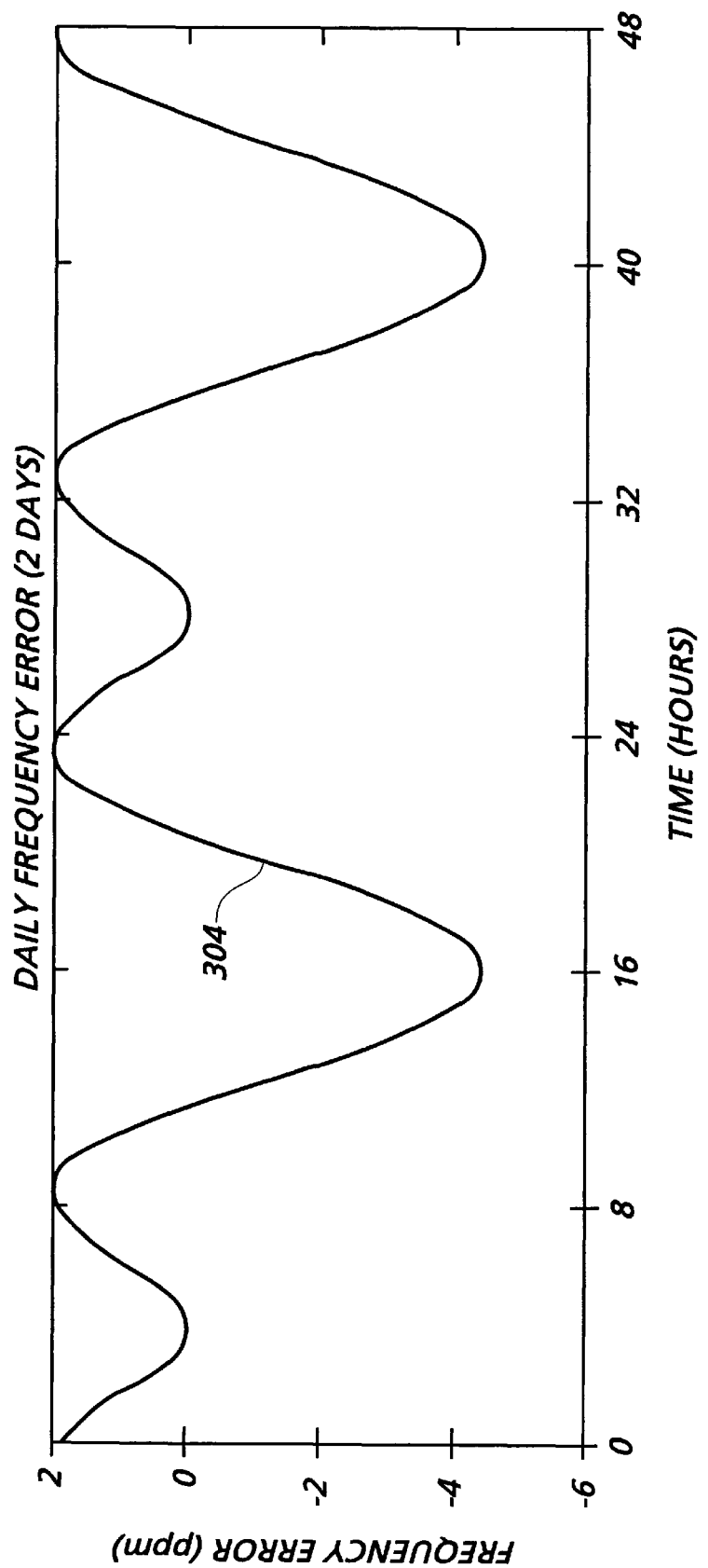
FIG. 9 shows error changing based on changes of the parameter in the manner illustrated in FIG. 8.

The frequency error 304 for the clock over a two day period is shown in FIG. 9. This error is determined by taking fluctuation in temperature 302 shown in FIG. 8 and finding the error 300 in FIG. 7 for this temperature.

Error accumulated up until a specified time is determined by integrating the error of FIG. 9 with respect to time. The accumulated error is:

$$\int_0^{time} error(temperature(t))\, dt$$

Figure 10:
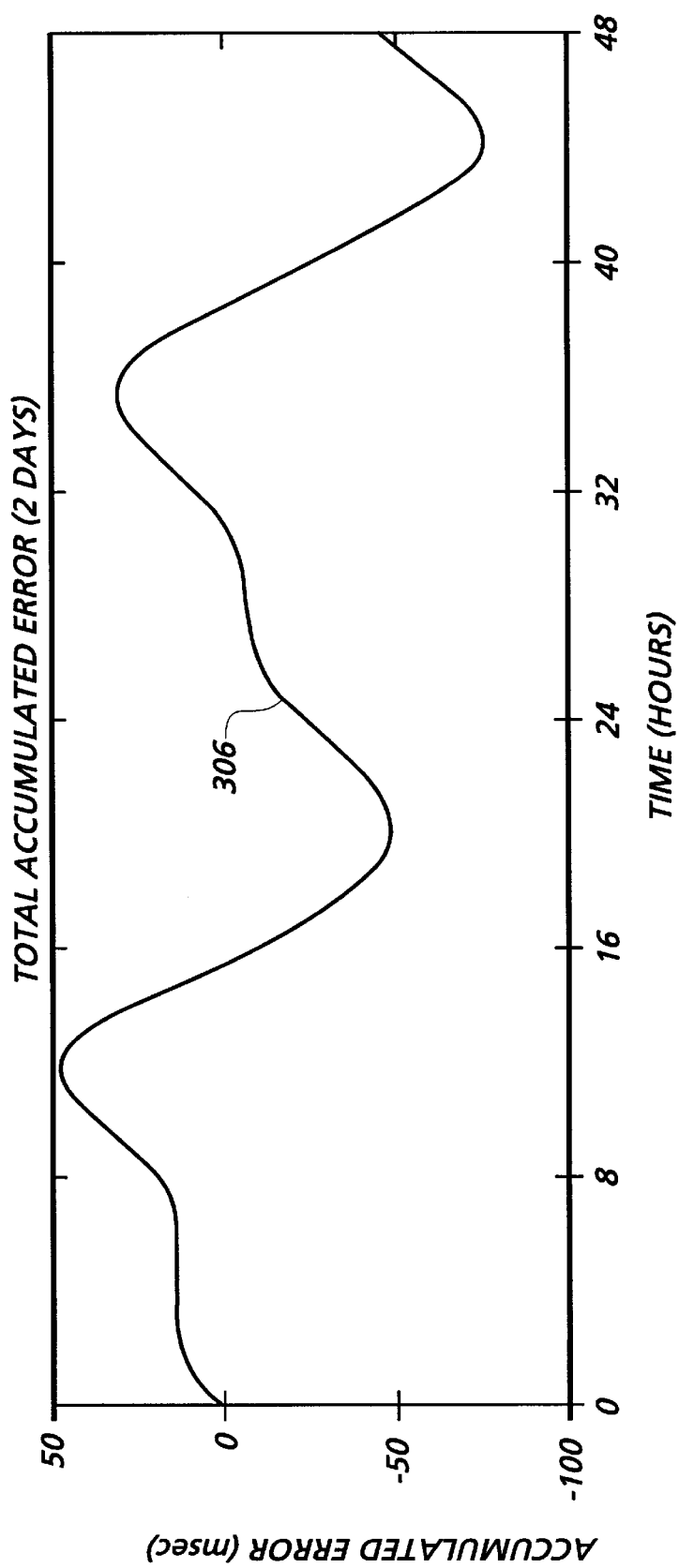
FIG. 10 illustrates accumulation of error.

More particularly, error at a particular time is the integral from time $0$ ($t_0$) to the end time ($t_x$) with respect to time. Note that in this example, the amount of error at a particular time depends on the temperature at that time. The total accumulated error 306 for two days is shown in FIG. 10. As will be appreciated by one of skill in the art, as the temperature fluctuates, the total amount of error present in the clock also fluctuates, although in this case there is an overall drift toward increased error over time.

Figure 11:
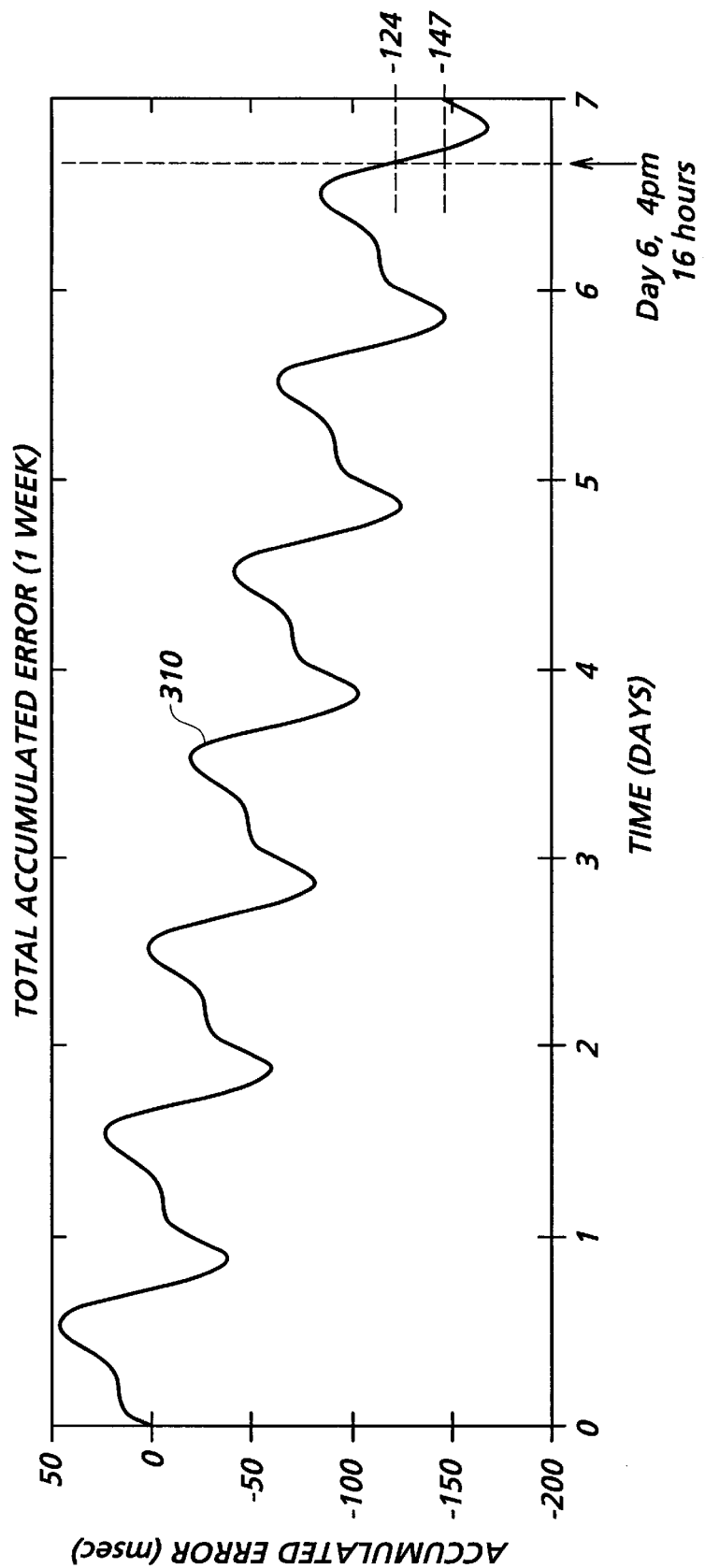
FIG. 11 also illustrates accumulation of error, but over a longer time period.

FIG. 11 shows the same total accumulated error for the clock shown in FIG. 10 over a longer period of time (one week instead of two days).

FIG. 11 provides a specific example that demonstrates a method for estimating error in a measurement. In this example, an event occurs at 4 pm on day 6. The time of the event is recorded. At the time of the event, the amount of actual error in the measuring instrument clock is −124 msec. At day 7 the time of the event is retrieved from the measuring instrument. The total error in the clock of the measuring instrument at day 7 is −147 msec. This total estimated error is then subtracted from the time of the event recorded by the measuring instrument to yield a corrected event time.

For purposes of illustrating the accuracy of this method, the remaining error is calculated as follows:

remaining error = (actual error) − (estimated error)
$$= -124 \text{ msec} - (-147 \text{ msec})$$
$$= -124 \text{ msec} + 147 \text{ msec}$$
$$= 23 \text{ msec}$$

Accordingly, if the estimated error of −147 is used to correct the time of the event, the remaining actual error will be 23 msec, which is only 18.5% of the total actual error at the time of the measurement.

In a preferred method of estimating error inherent in the event time, linear interpolation is used to mathematically model the error accumulation in the instrument. More particularly, if the accumulated error on day 0 is known (typically zero accumulated error) and the error on day 7 is known, a straight line can be drawn, thus providing a simple linear mathematical model of error accumulation that assumes the error was accumulated at a constant rate. Then, using this model, an estimation of the accumulated error at the time of the event is made. This is done by finding the point on the straight line for the specified time and determining the accumulated error by looking at the vertical axis. Simple formulas can also be used, as is known in the art.

Figure 12:
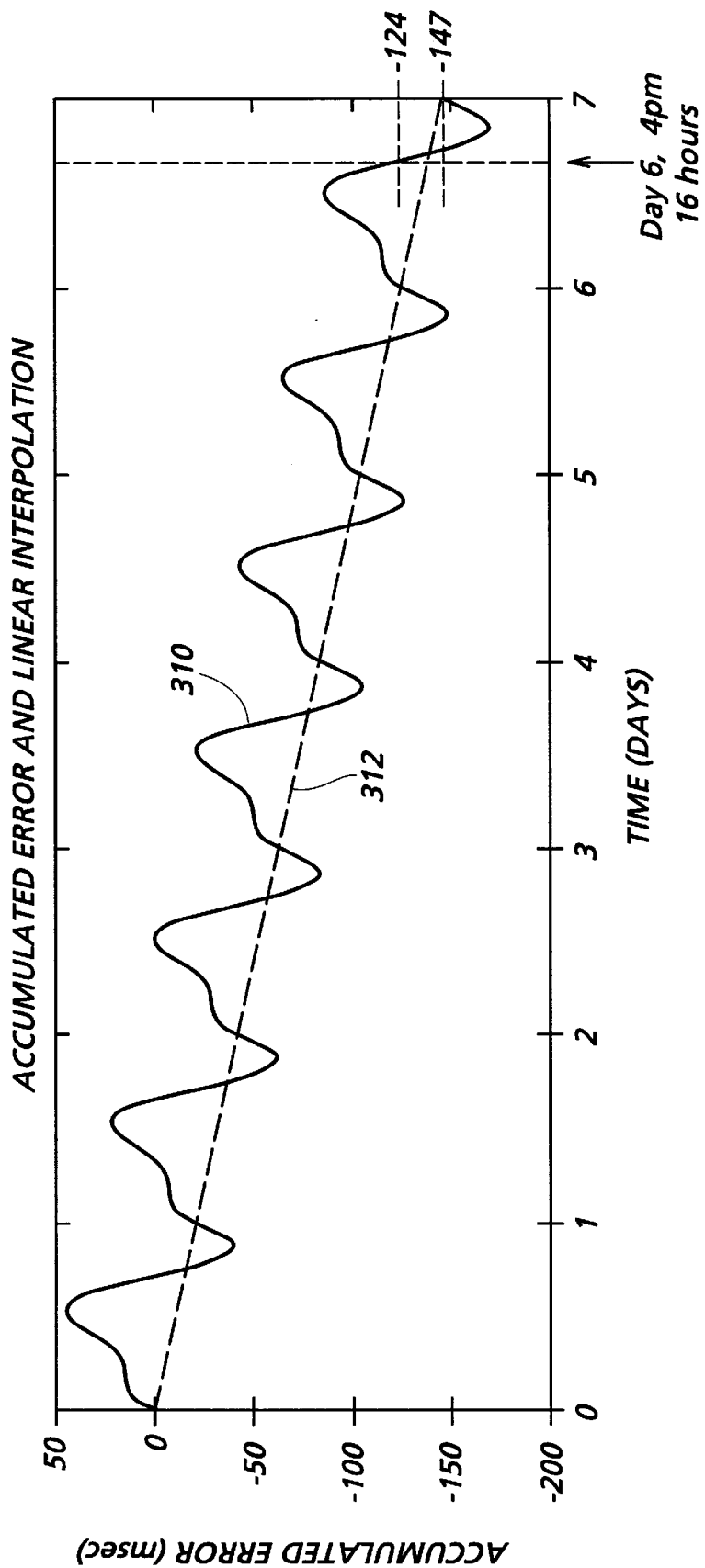
FIG. 12 illustrates use of linear interpolation to correct a measured parameter.

FIG. 12 provides a specific example that demonstrates the accuracy of using a linear mathematical model for estimating error. In this example, the event again occurs at 4 pm on day 6. As with the preceding example, the amount of actual error in the clock of the measuring instrument at the time of the event is −124 msec. At day 7 the time of the event is retrieved from the measuring instrument. Using, for example, linear interpolation from day 1 to day 7 described above, it can be estimated that at day 6, 4 pm, −140 msec of error existed in the measurement. This total error is then subtracted from the time of the event recorded by the measuring instrument to yield a corrected event time.

For purposes of illustrating the accuracy of this method, the remaining error is calculated as follows:

remaining error = (actual error) − (modeled error)
$$= -124 \text{ msec} - (-140 \text{ msec})$$
$$= -124 \text{ msec} + 140 \text{ msec}$$
$$= 16 \text{ msec}$$

Accordingly, if the modeled error of −140 is used to correct the measurement, the remaining actual error will be 16 msec, which is only 12.9% of the total actual error at the time of the measurement. Thus, it can be seen that this method of using a linear mathematical model to estimate error provides a more accurate error correction than the previous method which does not utilize a mathematical model. It will be appreciated by those skilled in the art that the linear interpolation may be taken at any time, and is not limited to the example described above.

In yet another method of estimating error inherent the event time, a non-linear interpolation is used to mathematically model the error accumulation. This model assumes that approximate error accumulation behavior is known at the time the correction is made. It will be appreciated, however, that the error accumulation behavior may be determined either before or after the event time is collected.

For the crystal described above, error can be modeled as an inverted parabola, as shown in FIG. 7. Assume that the crystal is modeled as having an error that varies with respect to temperature according to a modeled error function:

$$\text{modeled error} = 1.864 - 0.039(T-23)^2$$

where T is a specified temperature. For the most accurate results, it will be appreciated that the end points of the observed error should be equivalent, or nearly equivalent, to the end points of the modeled error. For purposes of illustration, this modeled error function is slightly different from the function described in connection with FIG. 7. This difference is included to demonstrate that reasonable results can be obtained using a slightly inaccurate model (assume that the model used in connection with FIG. 7 is an accurate description of behavior of the crystal).

If temperature measurements are made periodically and recorded, the modeled accumulated error can be determined by inserting temperature over a period of time into this function and integrating the resulting function with respect to time. Accordingly, in this instance, modeled error which is a function of temperature, can be determined as follows:

$$\text{Modeled accumulated error} = \int_0^{time} \text{modeled error(temperature}(t))\, dt$$

from time 0 to the specified time.

In practicing the invention, it will be appreciated by those skilled in the art that parameters other than temperature may be more appropriate for modeling the error, for example, instrumentation accuracy may vary depending upon atmospheric pressure, electric field, magnetic field, etc.

Figure 13:
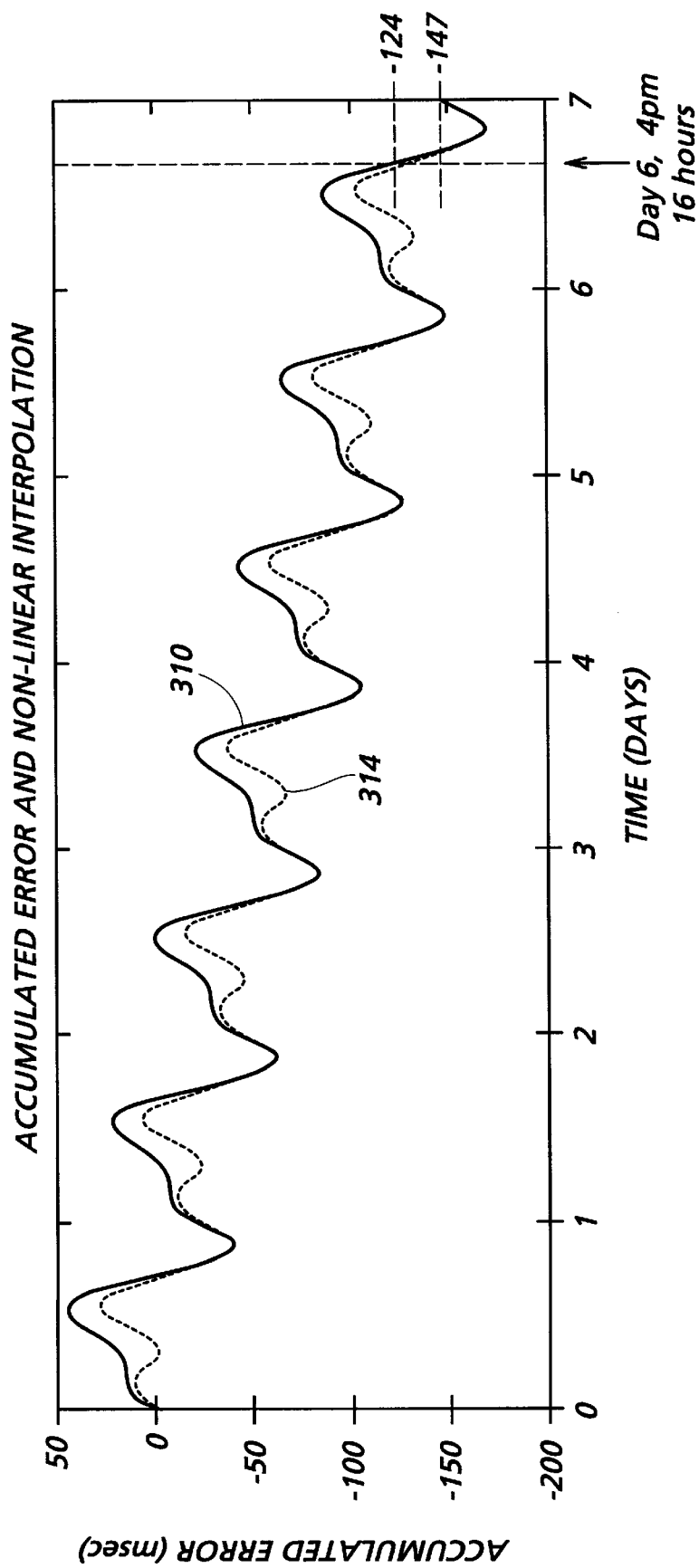
FIG. 13 illustrates use of non-linear interpolation to correct a measured parameter.

FIG. 13 illustrates an actual accumulated error 310 and a slightly inaccurate modeled accumulated error 314. It will be appreciated that models can be more or less accurate and still fall within the scope of the invention. Note that modeled accumulated error over the entire time period (seven days) is equal to actual accumulated error over the entire time period so that the starting and ending points of the non-linear model are equal. With this model, the modeled accumulated error up until the event time can be determined and used to correct the time recorded by the measuring instrument. This modeled accumulated error is even closer to actual accumulated error than the error obtained using the linear interpolation model discussed above.

Turning now to a specific example that demonstrates the accuracy of using a mathematical model for estimating error as shown in FIG. 13. In this example, the event again occurs at 4 pm on day 6. As with the preceding example, the amount of actual error in the measuring clock at the time of the event is −124 msec. At day 7 the data is retrieved from the measuring instrument. Using the non-linear interpolation from day 1 to day 7 with a model as described above, it can be estimated that at day 6, 4 pm, −133 msec of modeled error existed in the measurement. This modeled error is then subtracted the time of the event recorded by the measuring instrument to yield a corrected event time. For purposes of illustrating the accuracy of this method, the remaining error is calculated as follows:

$$\text{remaining error} = (\text{actual error}) - (\text{modeled error})$$
$$= -124\,\text{msec} - (-133\,\text{msec})$$
$$= 9\,\text{msec}$$

Accordingly, if the modeled error of −133 is used to correct the measurement, the remaining error will be 9 msec, which is only 7.3% of the total actual error at the time of the measurement.

In describing the three methods above for estimating error, the actual error was provided to illustrate the increasing accuracy that can be obtained using the methods. It will be appreciated by those skilled in the art that it is not necessary to know the actual error accumulated for an instrument at the event time in order to practice the invention. In practice, a measurement may be corrected with a high degree of confidence by using the mathematical modeling techniques described above to approximate the amount of error existing in the measuring instrument at the time the measurement was taken.

For example, for ease of illustration time and temperature have been used above to illustrate the invention. However, other parameters may be used for modeling depending on the nature of the measuring instrument without departing from the scope of the invention.

Figure 14:
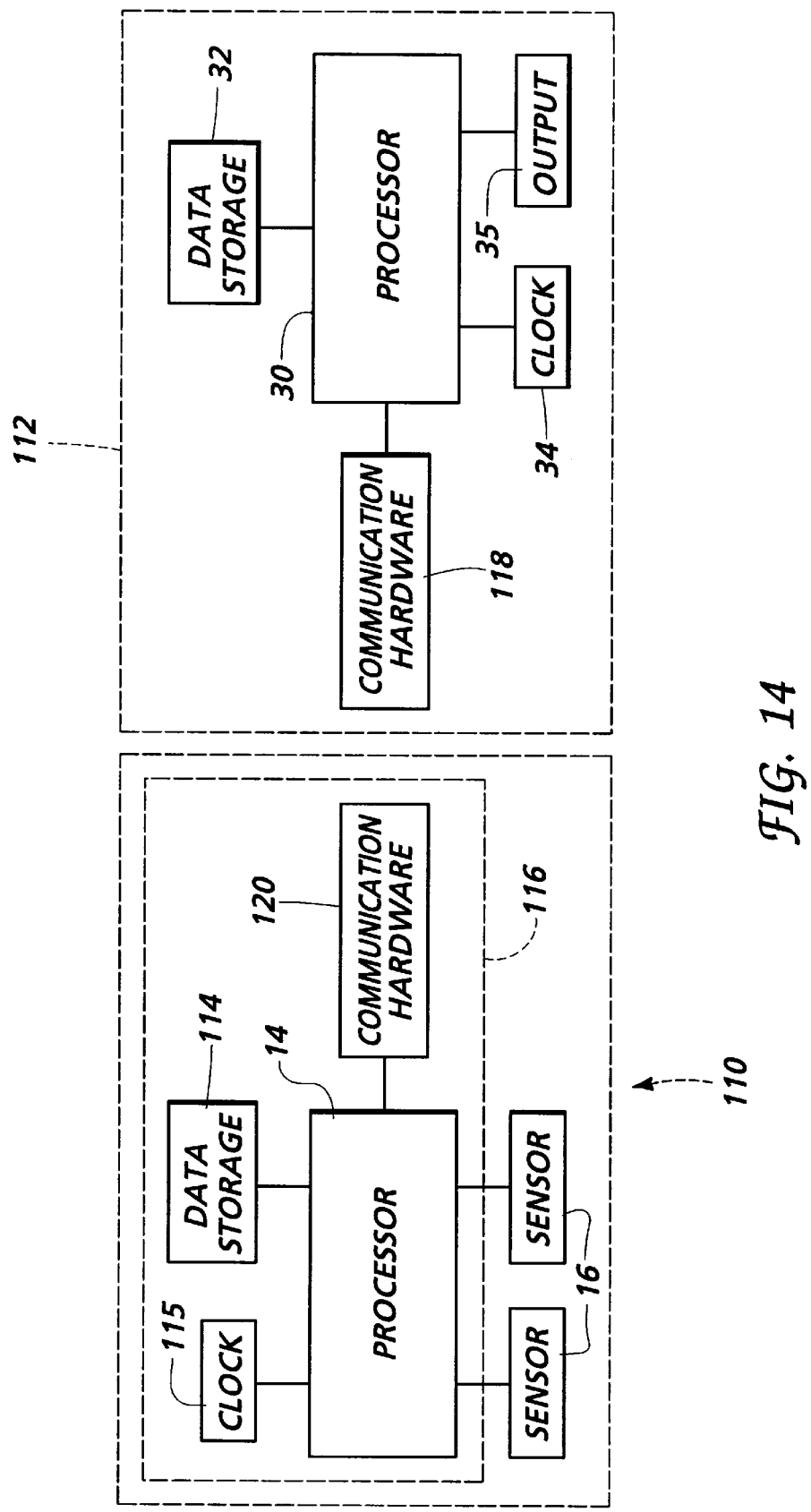
FIG. 14 is a schematic block diagram showing a data gathering system according to one alternative embodiment of the invention.

FIG. 14 illustrates a data gathering instrument 110 and a main data recovery unit 112 which are similar to the data gathering instrument 10 and main data recovery unit 12 of the embodiment of FIG. 1, like reference numerals indicating like components, except that the data gathering instrument 110 includes a clock 115 and a data storage medium 114 that is not removable. Communications hardware 116 is used to transfer data and clock information. The clock 112, data storage medium 114, processor 14, and communications hardware 120 are all located in a common housing 116. One or more sensors 16 communicate with the processor 14, and may either be supported by the housing 116 or removably connected to the housing, such as by a quick disconnect connector. The main data recovery unit 112 is similar to the main data recovery unit 12 of FIG. 1, except that the connector 36 is omitted and replaced by communications hardware 118. The communications hardware 118 communicates with communications hardware 116 in the data gathering instrument 110. Clock information and event data is recorded in the data storage medium 114 and later communicated by communications hardware 116 and 118 to the main data recovery unit 112. Thus, the data storage medium 114 does not need to be removable. The data storage medium 114 is random access memory (RAM), read only memory (ROM), flash memory, static RAM, EPROM, or other appropriate memory. These types of memories are lightweight and have no moving parts. In an alternative embodiment, the data storage medium 114 comprises a drive which uses disk, tape or other magnetic medium, or any other suitable form of memory. Drift in the clock 115 is determined using the communications hardware 118 and 120. More particularly, determining the amount of error in a measuring instrument (the clock 115) comprises coupling the data gathering instrument 110 with a communications network and transferring the stored time information from the instrument 110 to a main data recovery unit 112. Thereafter a determination of error is made according to the method shown in FIG. 6 as described above.

The communications hardware 118 and 120 can comprise equipment for connecting to a communications network, RF transmitters and receivers in each of the data gathering instrument 110 and the main data recovery unit 112, fiber optic transmitters and receivers in each of the data gathering instrument 110 and the main data recovery unit 112, cellular or other telephone equipment, infrared transmitters and receivers (for example, following the guidelines set forth by the Infrared Data Association) in each of the data gathering instrument 110 and the main data recovery unit 112, or connectors for direct connection. In one embodiment, the communications hardware 120 and 118 comprise network cards. In another embodiment, one of the communications hardware devices 118 and 120 comprises a modem, and the other comprises a network card (e.g. for a local area network connection leading to a modem or to the Internet).

Figure 15:
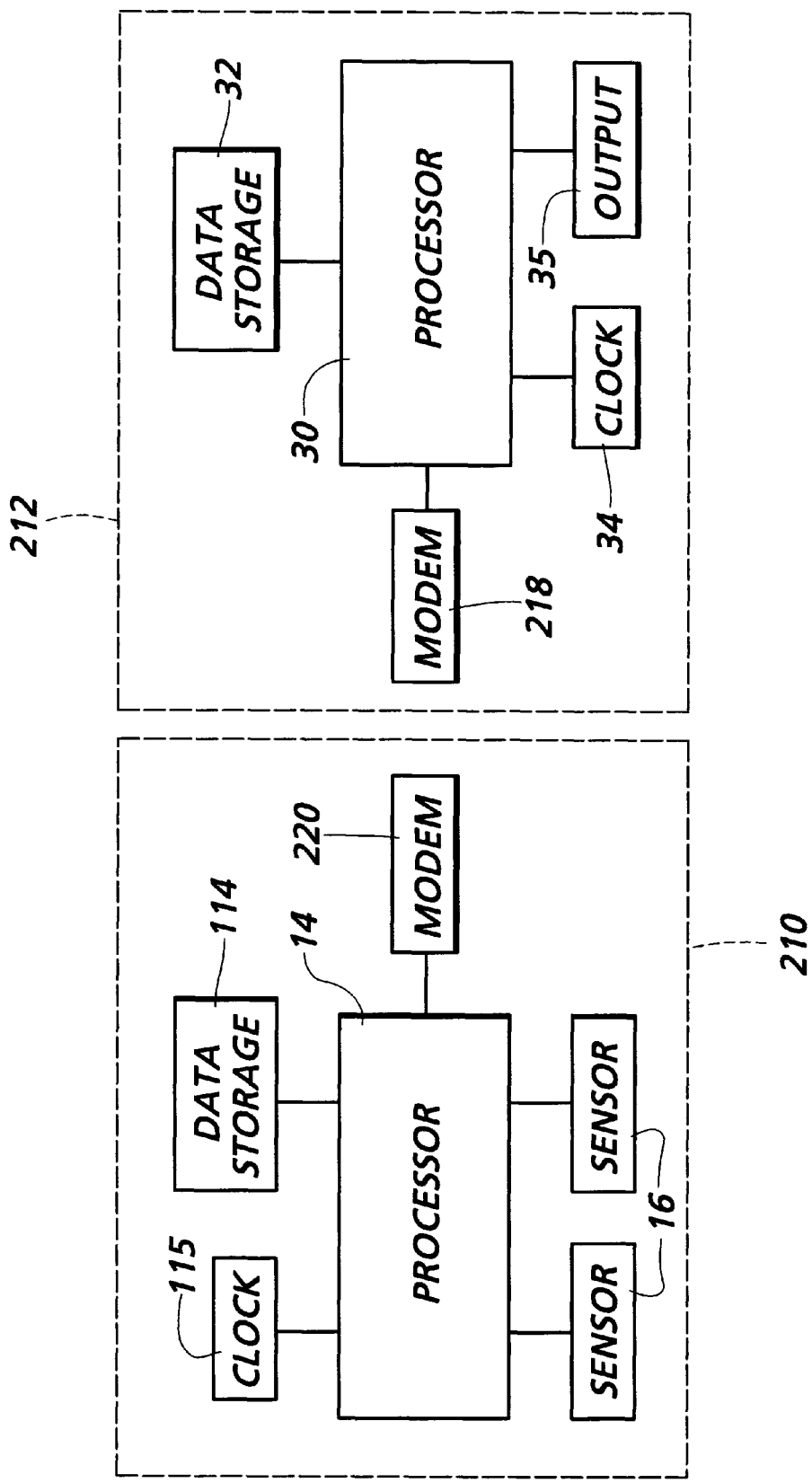
FIG. 15 is a schematic block diagram showing a data gathering system according to another alternative embodiment of the invention.

FIG. 15 illustrates a data gathering instrument 210 similar to the data gathering instrument 110, and a main data recovery unit 212 similar to the main data recover unit 112, like reference numerals indicating like components, except that the communications hardware devices 120 and 118 are defined by modems 220 and 218, respectively. In this embodiment, determining amount of error in stored time information comprises transferring the stored time information from the data gathering instrument 210, using the modem 220, to the data recovery unit 212. Thereafter a determination of error is made according to the method shown in FIG. 6.

In one embodiment, the instrument data storage medium 20 and the instrument clock 18 are physically connected, such as, for example, by a housing 38. In that case the separation of data storage medium 20 and clock 18 from the data gathering instrument occurs substantially simultaneously. In addition, physical connection of the two elements will help assure that the main data recovery unit will correctly associate the event and time data with the clock that provided the time data.

Figure 3:
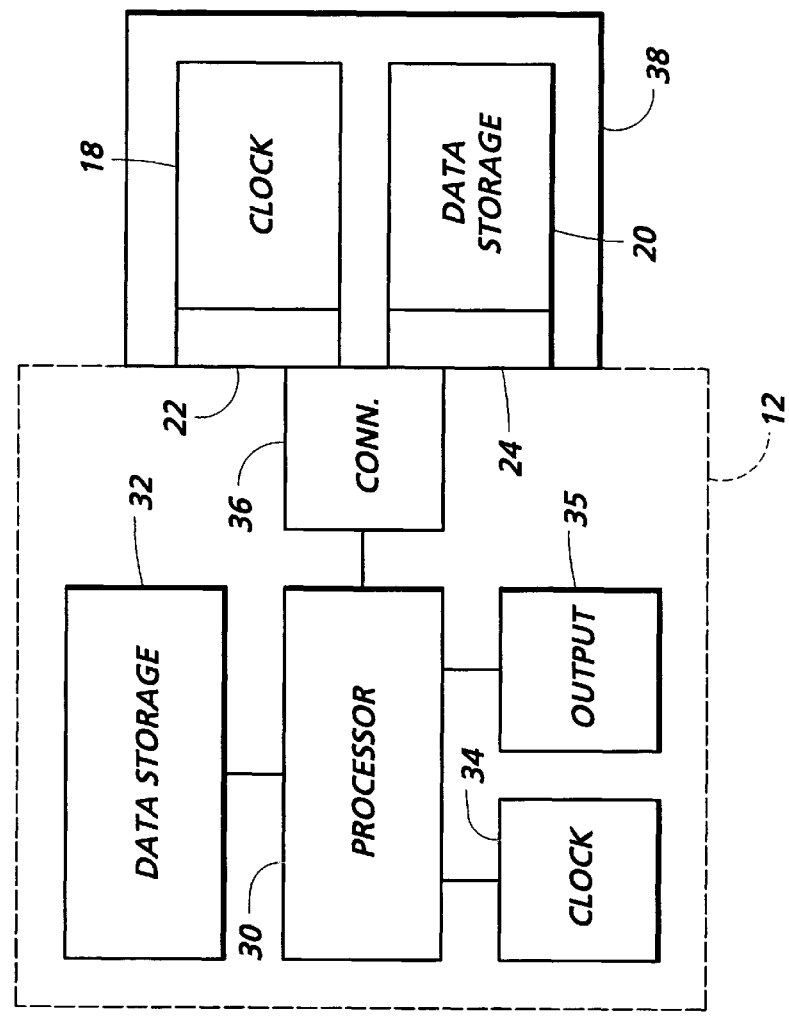
FIG. 3 is a schematic block diagram of a main data repository to which an instrument data module and an instrument clock module have been attached.

The data gathering systems shown in FIGS. 1–3 are particularly useful as part of a larger data gathering system that has multiple data gathering instruments collecting event data to be later transferred or copied to a single main data recovery unit. The data gathering instruments may be physically distant from the main data recovery unit, at least for the time during which the event data is gathered. After the event data has been gathered, the individual instrument data storage mediums and instrument clocks may be moved to the location of the main data recovery unit, either before or after the data storage mediums and clocks have been separated from their respective data gathering instruments.

The following example illustrates the invention. It is not intended to limit the invention in any way. In this example, the data gathering instrument is a defibrillator. A defibrillator is a therapeutic device that may be used to deliver an electrical shock to a patient's heart to correct an irregular rhythm such as ventricular fibrillation. Further details about defibrillators and defibrillation may be found in U.S. Pat. No. 5,607,454 "Electrotherapy Method and Apparatus," and U.S. patent application Ser. No. 08/240,272, "Defibrillator With Self-Test Features," filed May 10, 1994, the disclosures of which are incorporated herein by reference.

In addition to providing the electrical shock, a defibrillator may also collect physiological information from the patient, such as an ECG signal of the electrical activity of the patient's heart over the course of the monitoring time. This event data may be stored by the defibrillator for later use by medical personnel in the diagnosis and treatment of the patient. In addition, event data relating to the operation of the defibrillator (e.g., capacitor voltage during charging and discharging or the time at which shocks were delivered) and even event data consisting of the voices of the assisting medical personnel may be recorded for later use.

Figure 4:
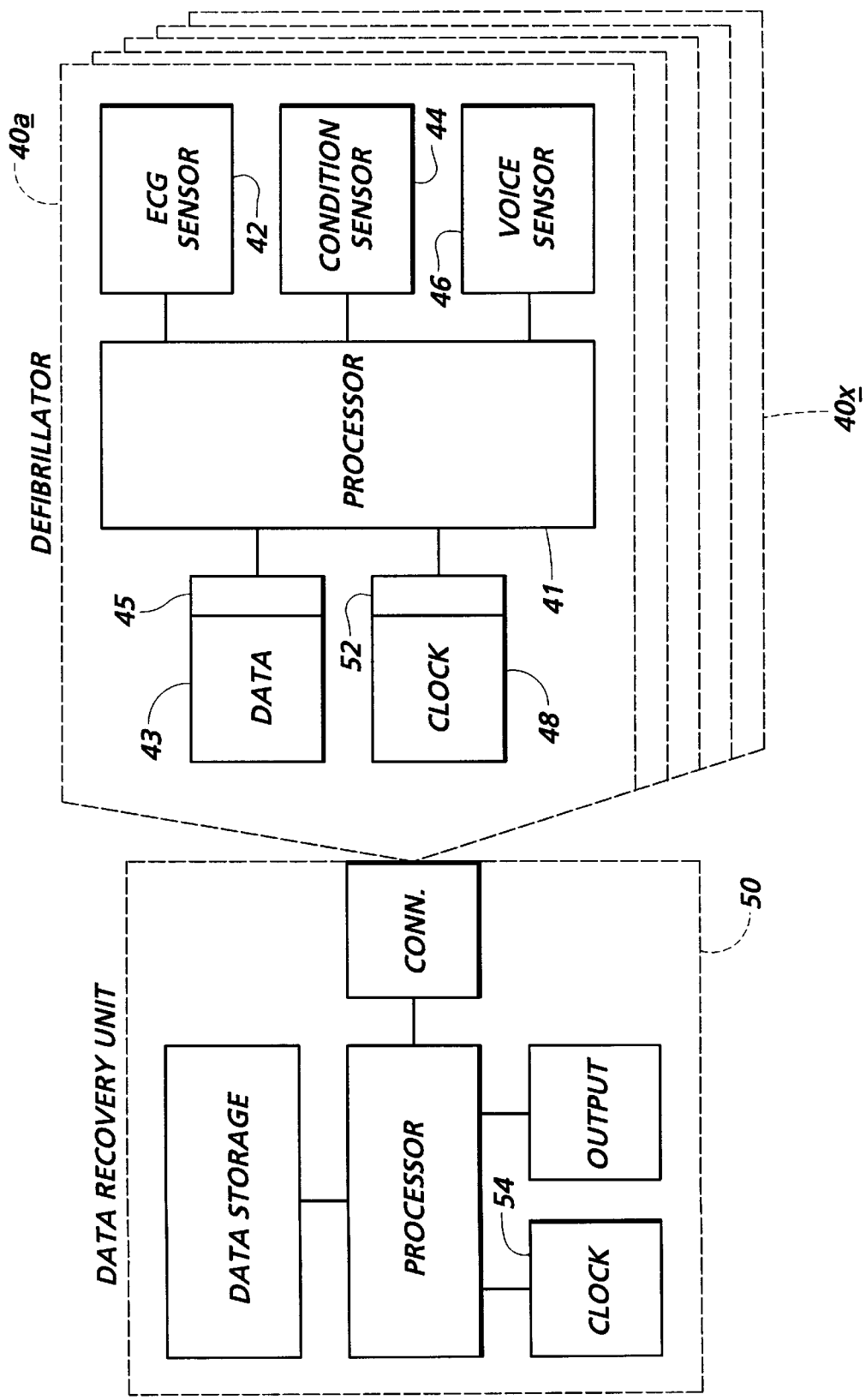
FIG. 4 is a schematic block diagram of a data gathering system according to this invention.

Defibrillators may be deployed on emergency medical vehicles for use in the field by medical personnel. Event data collected by the defibrillators may be used later in a location, such as a hospital, which is physically distant from the initial treatment location. With reference to FIG. 4, according to this invention, a defibrillator data storage medium 43 containing the event data collected by the defibrillator 40 a through its ECG sensor 40, defibrillator condition sensor 44 and voice sensor 46 through the operation of processor 41 can be separated from the defibrillator and connected to a main data recovery unit 50 (such as a computer) in the hospital or other location through appropriate connectors 45 and 52. In this way, the event data is available for later diagnosis and treatment, and the defibrillator itself remains available for use in the field.

Also, the instrument clock 48 used by the defibrillator to associate time information with the ECG, voice, defibrillator operating condition, and/or other event data can be separated from the defibrillator as well and connected to the main data recovery unit along with the data storage medium. This step permits a comparison between the instrument clock 48 and a main clock 54 within the main data recovery unit so that the defibrillator event data can be associated with synchronized time. This comparison can be used to determine whether synchronized time indicated by the instrument clock (i.e., the time associated with the recorded event data) differs from the synchronized time standard shown by the main data recovery unit. In addition, the ability to connect the instrument clock and the main clock permits synchronization of the defibrillator clock prior to use in the field and correction for any instrument clock drift after use in the field through interpolation or any other known technique.

Furthermore, this system permits multiple defibrillators to synchronize their instrument clocks with a single main clock and to transfer or copy their collected event data into a single data recovery unit. Thus, as shown schematically in FIG. 4, multiple substantially identical defibrillators 40a–40x can gather event data at locations remote from a central data recovery unit. The event data gathered by each will eventually be recovered in a single place and will be synchronized to a single time source.

Each data gathering instrument may uniquely identify the data it gathers so that the main data recovery unit will be able to distinguish event data gathered from one instrument from other event data. This data identification may be done in any manner known in the art.

This invention can be used to learn valuable information regarding emergency medical response times. Since the instrument clocks are each synchronized to the clock in the main data recovery unit, the main data recovery unit can accurately calculate the time between dispatch (if the dispatch clock is synchronized to the main data recovery unit clock) and use of the defibrillator to treat the patient. The calculated response times for each defibrillator can be accurately compared, since each defibrillator clock is synchronized to the same recovery unit clock. The invention also eliminates the need for a technician to periodically set a reference time source (such as his or her watch) from the main clock and visit all of the remote defibrillator sites in order to keep all of the instrument clocks in the system synchronized.

Figure 5:
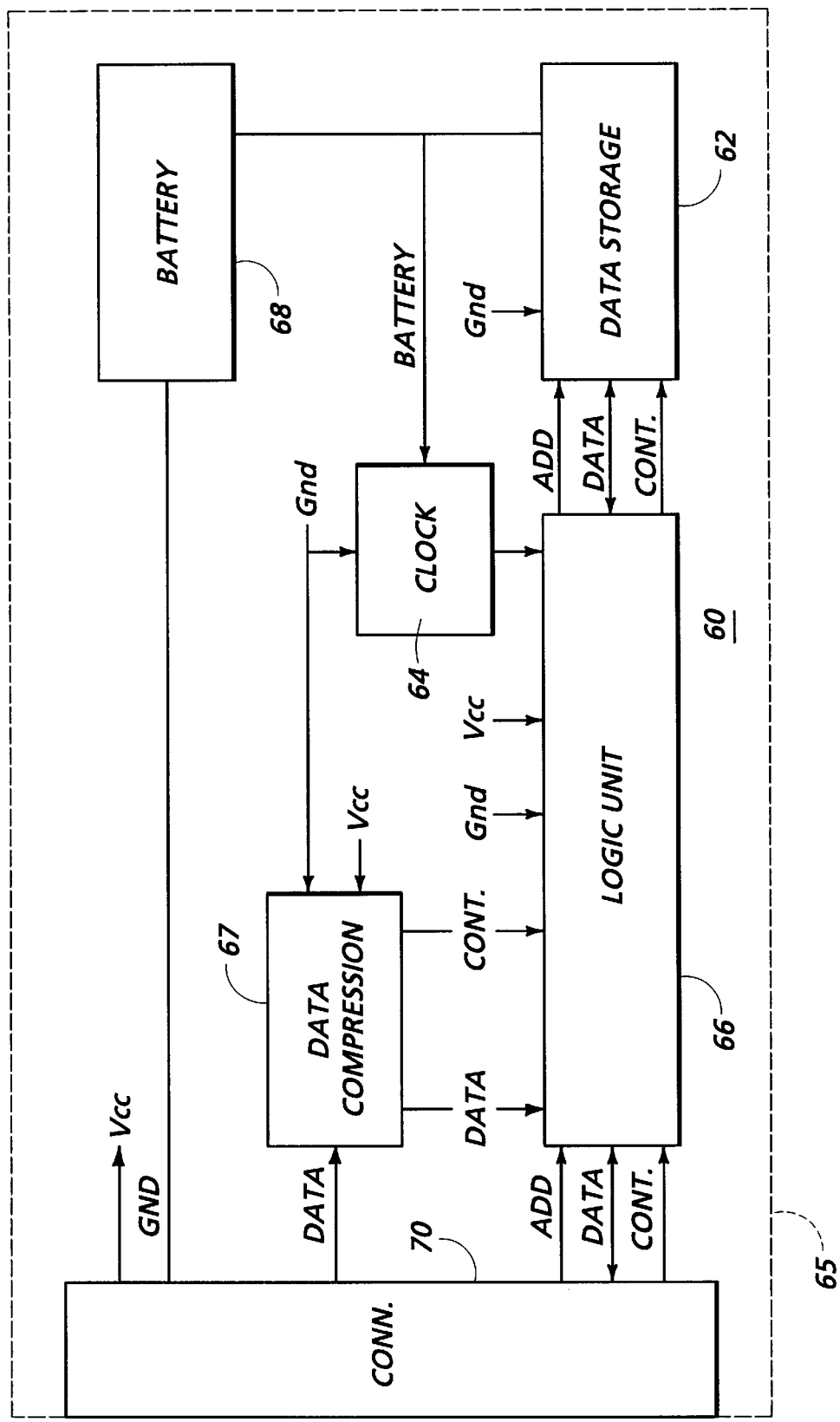
FIG. 5 is a schematic block diagram of an event data storage apparatus for use with a data gathering instrument.

The preferred embodiment of an instrument data storage medium and instrument clock is shown in FIG. 5. This embodiment can be used, for example, in a defibrillator as discussed above. In this embodiment, the instrument data storage medium and instrument clock are both disposed in a package conforming to Personal Computer Memory Card International Association (PCMCIA) Release 2.1 standard. Information regarding this standard and details about the construction of PCMCIA cards and their interfacing connectors may be found in U.S. Pat. Nos. 5,334,030; 5,345,367; 5,338,210; and PCMCIA Standards, release 2 (November, 1992); the disclosures of which are incorporated herein by reference.

FIG. 5 is a schematic representation of the components of the combination data storage medium 62 and instrument clock 64 arranged on a circuit board 60 within the PCMCIA housing 65. Data storage medium 62 may be any suitable digital medium, such as flash memory or static RAM, with the memory storage capacity dictated by the application. Clock 64 is preferably an oscillator whose frequency also depends on the application.

A logic unit 66, such as an ASIC, gate array or processor, controls the clock 64 and the event data going to and coming from data storage medium 62. An optional data compression chip 67 may also be provided to compress some or all of the data stored in medium 62, such as voice data. A power source 68, such as a lithium battery, provides power (as necessary) to the data storage medium 62 and clock 64. Communication between the PCMCIA card and any device to which the card is connected is through a card connector 70, as is known to those familiar with PCMCIA cards. Communication within the PCMCIA card is accomplished via suitable communication channels or buses, as is also known in the art.

The following is a summary of the use of the method of this invention as applied to a data gathering system consisting of two or more mobile defibrillators and a single central data recovery unit located within a primary care facility. This description assumes that the defibrillators' instrument clock modules and data storage modules are configured in a PCMCIA card format such as the one described above. It should be understood, however, that other clock and data storage module designs fall within the scope of this invention.

An emergency medical vehicle carrying a defibrillator is dispatched from the primary care facility in response to a call for assistance. The dispatch time for each be noted in some manner. When it is deployed by medical personnel, the defibrillator begins gathering and storing event data and the synchronized time associated with the event data. As discussed above, the event data may include defibrillator operating condition, patient ECG and ambient voice data. After treatment, the PCMCIA card containing the stored event data and a defibrillator instrument clock is removed from the defibrillator and inserted into the central data recovery unit (e.g., the computer).

The computer can extract the event data from the PCMCIA card data storage medium for analysis, display, and/or storage in the computer or in an associated peripheral data storage device. The analysis could possibly include calculation of time from dispatch to first shock; response of the patient's ECG to the shock; and correlation of voice data information (e.g., descriptions of the patient's condition spoken aloud by the attending medical personnel) with the ECG and defibrillator operating condition data.

In addition, the computer can compare the defibrillator instrument clock with the computer's own main clock to determine whether the recorded defibrillator synchronized times should be corrected for drift and to perform the correction as described above. The time-corrected data can thus be used to acquire accurate care delivery system performance information useful for quality assurance.

The invention includes modifications to the embodiments described above. For example, the data storage medium used in either the data gathering instrument or in the data recovery unit can be any suitable digital or analog medium. Also, formats other than the PCMCIA format for the instrument clock and instrument data storage may be used. Neither the instrument data storage medium and its connector nor the instrument clock and its connector need be arranged as a single module. In fact, connectors need not be used at all if some other means of information transfer (e.g., IR or RF transmission) is used. In addition, while defibrillators are described in detail above, this invention may be adapted to any data gathering instrument.

Other modifications falling within the scope of the invention will be apparent to those skilled in the art. All references cited herein are incorporated by reference in their entirety.

What is claimed is:

1. A method for using a measuring instrument capable of taking a measurement comprising:
   (a) using the measuring instrument to take a measurement;
   (b) storing the measurement in a data storage medium;
   (c) estimating an error in the measurement using a mathematical model; and
   (d) correcting the measurement of step (a) at a later time to remove the estimated error.

2. The method of claim 1 further comprising the step of:
   (a)(i) associating time data with the measurement.

3. The method of claim 2 wherein the correcting step further comprises the steps of:
   (d)(i) determining an amount of deviation between the time data taken by the measuring instrument and time data taken by a reference instrument;
   (d)(ii) calculating the estimated error in the time data taken by the measuring instrument by applying the deviation determined at step (d)(i) to the mathematical model; and
   (d)(iii) removing the estimated error determined at step (d)(ii) from the time data of step (a).

4. The method of claim 3 wherein determining the amount of deviation between the defibrillator and the reference instrument is accomplished by transmitting data from the defibrillator to the reference instrument for analysis.

5. The method of claim 3 wherein data recorded by the defibrillator is selected from the group comprising: patient data, self-test results, user information, and system status information.

6. The method of claim 1 wherein correcting step further comprises the steps of:
   (d)(i) determining an amount of deviation between the measurement taken by the measuring instrument and a measurement taken by a reference instrument;
   (d)(ii) calculating the estimated error by applying the deviation determined at step (d)(i) to the mathematical model; and
   (d)(iii) removing the estimated error determined at step (d)(ii) from the measurement of step (a).

7. The method of claim 3 wherein determining the amount of deviation between the measuring instrument and the reference instrument is accomplished by transmitting data from the measuring instrument to the reference instrument for analysis.

8. A method for using a defibrillator capable of recording data comprising:
   (a) using the defibrillator to record data;
   (b) storing the data in a data storage medium;
   (c) estimating an error in the data using a mathematical model; and
   (d) correcting the data of step (a) at a later time to remove the estimated error.

9. The method of claim 8 further comprising the step of:
   (a)(i) associating time data with the data.

10. The method of claim 9 wherein correcting step further comprises the steps of:
   (d)(i) determining an amount of deviation between the time data taken by the defibrillator and time data taken by a reference instrument;
   (d)(ii) calculating the estimated error in the time data by applying the deviation determined at step (d)(i) to the mathematical model; and
   (d)(iii) removing the estimated error determined at step (d)(ii) from the data of step (a).

11. The method of claim 8 wherein the correcting step further comprises the steps of:
   (d)(i) determining an amount of deviation between the data recorded by the defibrillator and a measurement taken by a reference instrument;
   (d)(ii) calculating the estimated error in the data recorded by the defibrillator by applying the deviation determined at step (d)(i) to the mathematical model; and
   (d)(iii) removing the estimated error determined at step (d)(ii) from the data of step (a).

* * * * *